United States Patent
Aoki et al.

(10) Patent No.: US 11,196,073 B2
(45) Date of Patent: Dec. 7, 2021

(54) PROTON CERAMICS FUEL CELL AND METHOD FOR PRODUCTION OF SAME

(71) Applicant: NATIONAL UNIVERSITY CORPORATION HOKKAIDO UNIVERSITY, Sapporo (JP)

(72) Inventors: Yoshitaka Aoki, Sapporo (JP); Hiroki Habazaki, Sapporo (JP); Tomoyuki Yamaguchi, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 16/975,997

(22) PCT Filed: Feb. 22, 2019

(86) PCT No.: PCT/JP2019/006671
§ 371 (c)(1),
(2) Date: Aug. 26, 2020

(87) PCT Pub. No.: WO2019/167811
PCT Pub. Date: Sep. 6, 2019

(65) Prior Publication Data
US 2021/0043957 A1    Feb. 11, 2021

(30) Foreign Application Priority Data
Feb. 27, 2018    (JP) .............................. JP2018-032702

(51) Int. Cl.
*H01M 8/1253* (2016.01)
*H01M 4/94* (2006.01)
(Continued)

(52) U.S. Cl.
CPC ....... *H01M 8/1253* (2013.01); *H01M 4/8673* (2013.01); *H01M 4/94* (2013.01);
(Continued)

(58) Field of Classification Search
CPC .... H01M 8/1253; H01M 4/8673; H01M 4/94; H01M 8/126; H01M 2004/8689; H01M 2008/1293; H01M 2300/0077
See application file for complete search history.

(56) References Cited

U.S. PATENT DOCUMENTS

| | | | |
|---|---|---|---|
| 2001/0018989 A1* | 9/2001 | Taniguchi | C04B 35/48 174/265 |
| 2009/0233151 A1* | 9/2009 | Iijima | H01M 8/1253 429/411 |
| 2013/0224627 A1* | 8/2013 | Liu | H01M 8/1246 429/489 |

FOREIGN PATENT DOCUMENTS

| | | |
|---|---|---|
| JP | 2005-243423 | 9/2005 |
| JP | 2007-197315 | 8/2007 |

(Continued)

OTHER PUBLICATIONS

International Preliminary Report on Patentability issued in International Application No. PCT/JP2019/06671, dated Mar. 17, 2020, 14 pages w/translation.

(Continued)

*Primary Examiner* — Stewart A Fraser
(74) *Attorney, Agent, or Firm* — Hamre, Schumann, Mueller & Larson, P.C.

(57) ABSTRACT

The present invention relates to a proton ceramic fuel cell which has a hydrogen-permeable film as an anode and in which an electrolyte material is $BaZr_xCe_{1-x-z}Y_zO_3$ (x=0.1 to 0.8, z=0.1 to 0.25, x+z≤1.0) (BZCY). An electron-conducting oxide thin film having a film thickness of 1-100 nm is present between a cathode and an electrolyte comprising the material. The present invention also relates to a method for producing a proton ceramic fuel cell having a hydrogen-permeable film as an anode. The method comprises forming a thin film having a thickness of 1-100 nm between a (Continued)

cathode and an electrolyte comprising BZCY, the thin film comprising an electron-conducting oxide. The present invention provides a novel means for improving the output of a PCFC in which BZCY is used in an electrolyte material, and provides a PCFC having an output that exceeds a benchmark of 0.5 W cm$^{-2}$ at 500° C.

19 Claims, 10 Drawing Sheets

(51) Int. Cl.
- *H01M 8/126* (2016.01)
- *H01M 4/86* (2006.01)
- *H01M 8/124* (2016.01)

(52) U.S. Cl.
CPC .... *H01M 8/126* (2013.01); *H01M 2004/8689* (2013.01); *H01M 2008/1293* (2013.01); *H01M 2300/0077* (2013.01)

(56) References Cited

FOREIGN PATENT DOCUMENTS

| | | |
|---|---|---|
| JP | 2007-317627 | 12/2007 |
| JP | 2009-021195 | 1/2009 |
| JP | 2012-234747 | 11/2012 |
| JP | 2013-206703 | 10/2013 |
| JP | 2015-046251 | 3/2015 |
| KR | 10-2015-0081928 | 7/2016 |

OTHER PUBLICATIONS

International Search Report issued in International Application No. PCT/JP2019/06671, dated May 7, 2019, 7 pages w/translation.
Kreuer, "Proton-Conducting Oxides", Annu. Rev. Mater. Res. 2003, vol. 33, pp. 333-359.
Duan, et al., "Readily processed protonic ceramic fuel cells with high performance at low temperatures", Science, vol. 349, issued 6254, Sep. 18, 2015, pp. 1321-1326.
Fabbri, et al., "Materials challenges toward proton-conducting oxide fuel cells: a critical review", Chemical Society Reviews, vol. 39, 2010, pp. 4355-4369.
Bae, et al., "Demonstrating the potential of yttrium-diped barium zirconate electrolyte for high-performance fuel cells", Nature Communications, 8:14553, 2017, 9 pages.
Kim, et al., "Triple-Conducting Layered Perovskites as Cathode Materials fro Proton-Conducting Solid Oxide Fuel Cells", ChemSusChem, vol. 7, 2014, pp. 2811-2815.
Wang, et al., "Preparation of a La0.5Sr0.5CoO3/PbZr0.56Ti0.44O3/La0.5Sr0.5CoO3 multilayer structure on SrTiO3 (100) and LaAlO3(100) substrates using the sol-gel method", Applied Physics Letters, vol. 67, 1995, pp. 1692-1694.
Aoki, et al., "Electrochemical Impedance Spectroscopy of High-Efficiency Hydrogen Membrane Fuel Cells Based on Sputter-Deposited BaCe0.8Y0.2O3-δ Thin Films", The Journal of Physical Chemistry, vol. 120, 2016, pp. 15976-15985.
Oishi, et al., "Defect structure analysis of B-site doped perovskite-type proton conducting oxide BaCeO3 Part 2: The electrical conductivity and diffusion coefficient of BaCe0.9Y0.1O3-δ", Sold State Ionics, vol. 170, 2008, pp. 2240-2247.

\* cited by examiner (a)

(b)

PROTON CERAMICS FUEL CELL AND METHOD FOR PRODUCTION OF SAME

TECHINCAL FIELD

The present invention relates to a proton ceramics fuel cell having a hydrogen permeable membrane as an anode and a method for production of the same.

CROSS-REFERENCE TO RELATED APPLICATIONS

This application claims priority to Japanese Patent Application No. 2018-32702, filed Feb. 27, 2018, the entire disclosure of which is specifically incorporated herein by reference.

BACKGROUND OF THE INVENTION

Solid oxide fuel cells (SOFC) are expected to be used as a power source for transportation vehicles and as a biomass dispersed power source because they can use not only pure hydrogen but also various fuels and do not need to use expensive Pt. However, the one currently being developed has an operating temperature of 700° C. or more, which is extremely high, and thus has problems of life and maintenance, and it is very difficult to introduce it into a vehicle. Therefore, there is an urgent need to develop methods to reduce the operating temperature of SOFC to 500° C. or below.

Compared to the oxide ion conductive $Y_{0.1}Zr_{0.9}O_2$ used in conventional SOFC, the proton conductive ceramic $BaZr_{1-x}Ce_{0.9-x}Y_{0.2}O_3$ (x=0.1 to 0.8) exhibits high ionic conductivity in a medium temperature region of 400 to 600° C. [Non-Patent Document 1]. Therefore, a proton ceramics fuel cell (hereinafter sometimes abbreviated as PCFC) using this as an electrolyte material is expected to be a fuel cell replaceable with the conventional SOFC, operating at the medium temperature. However, its output is still small, and even the latest papers set 0.5 W cm$^{-2}$ as a benchmark at 500° C. [Non-Patent Documents 2 and 3]. The main factor is a large polarization resistance at the cathode/electrolyte interface [Non-Patent Document 3].

Regarding the anode-supported PCFCs recently reported and showing relatively good output characteristics, the peak output at each operating temperature was respectively listed in FIG. 1 (Non-Patent Documents 2, 4, and 5). The target area of the PCFC is an area obtainable high output as possible at 550° C. or lower, desirably 500° C. or lower, that is, the area with the gray background in FIG. 1 (about 350-570° C., about 0.3-1.5 W cm$^{-2}$).

Non-Patent Document 1: K. D. Kreuer, *Annu. Rev. Mater. Res.* 33 (2003) 333.
Non-Patent Document 2: C. Duan et al., *Science*, 349, 1321 (2015).
Non-Patent Document 3: E. Fabbri et al., *Chem. Soc. Rev.*, 39, 4355 (2010).
Non-Patent Document 4: K. Bae et al., *Nature Commun.*, 8, 14553 (2017).
Non-Patent Document 5: J. Kim et al, *ChemSusChem.*, 7, 2811 (2014).
Non-Patent Document 6: F. Wang et al, *Appl. Phys. Lett.*, 67, 1692 (1995).
Non-Patent Document 7: Y. Aoki et al, *J. Phys. Chem.C*, 120, 15976 (2016).
Non-Patent Document 8: M. Oishi et al, *Solid State Ionics*, 179, 2240 (2008). The entire descriptions of Non-Patent Documents 1-8 are incorporated herein by reference in particular.

SUMMARY OF THE INVENTION

However, as seen from FIG. 1, few PCFCs have been reported in the power density region of about 350 to 570° C. and about 0.3 to 1.5 W cm$^{-2}$. An object of the present invention is to provide a PCFC having an output exceeding the benchmark of 0.5 W cm$^{-2}$ at 500° C.

The object of the present invention is to provide a novel means for enhancing output of a PCFC using $BaZr_xCe_{1-x-z}Y_zO_3$ (x=0.1 to 0.8, z=0.1 to 0.25, x+z≤1.0) (hereinafter simply referred to as BZCY) as an electrolyte material and provide a PCFC having an output exceeding the above benchmark (0.5 W cm$^{-2}$ at 500° C.).

The present inventors have found that in a PCFC which has a hydrogen permeable film as an anode and has, as an electrolyte, a BZCY thin film produced by a vapor deposition method such as sputtering, when a thin film of electron conductive oxide (hereinafter may be abbreviated as ECO) such as $La_{0.5}Sr_{0.5}CoO_3$ (hereinafter may be abbreviated as LSC) of about 1 to 100 nm is formed on the thin film surface, for example, by a vapor deposition, the output of the cell may increase several times as compared with the case without the thin film. The present inventors have completed the present invention by this finding.

The present invention is as follows:

[1] A proton ceramics fuel cell in which an electrolyte material is $BaZr_xCe_{1-x-z}Y_zO_3$ (x=0.1 to 0.8, z=0.1 to 0.25, x+z≤1.0) and a hydrogen permeable membrane is an anode, wherein the fuel cell comprises an electron conductive oxide thin film having a film thickness in a range of 1 to 100 nm between the electrolyte made of the above material and a cathode.

[2] The fuel cell according to [1], wherein the electron conductive oxide is lanthanum-containing perovskite compound, nickel oxide, manganese oxide, zinc oxide or indium oxide.

[3] The fuel cell according to [2], wherein the lanthanum-containing perovskite compound contains strontium and/or cobalt.

[4] The fuel cell according to [2], wherein the lanthanum-containing perovskite compound is $La_{0.5}Sr_{0.5}CoO_3$.

[5] The fuel cell according to any one of [1] to [4], wherein the film thickness of the thin film is in a range of 5 to 80 nm.

[6] The fuel cell according to any one of [1] to [5], wherein the electron conductive oxide is an aggregate of polycrystalline or amorphous particles or mixtures thereof.

[7] The fuel cell according to any one of [1] to [6], wherein operating temperature is in a range of 400 to 600° C.

[8] A method for production of a proton ceramics fuel cell comprising a hydrogen permeable membrane as an anode, wherein the method comprises formation of a thin film having a film thickness in a range of 1 to 100 nm between an electrolyte made of $BaZr_xCe_{1-x-z}Y_zO_3$ (x=0.1 to 0.8, z=0.1 to 0.25, x+z≤1.0) and a cathode, and the thin film is comprised of an electron conductive oxide.

[9] The method for production according to [8], wherein the electron conductive oxide is lanthanum-containing perovskite compound, nickel oxide, manganese oxide, zinc oxide or indium oxide.

[10] The method for production according to [8] or [9], wherein the electron conductive oxide is an aggregate of polycrystalline or amorphous particles or mixtures thereof.

[11] The method for production according to any one of [8] to [10], wherein the electron conductive oxide thin film is formed by a sputtering method or a sol-gel method.

Effect of the Invention

According to the present invention, in a PCFC using BZCY as an electrolyte material and having a hydrogen-permeable membrane as an anode, it is possible to provide a new means capable of enhancing the output of the PCFC. Furthermore, according to the present invention, it is possible to provide a PCFC having an output exceeding the above benchmark.

EMBODIMENTS OF THE INVENTION

Figure 1:
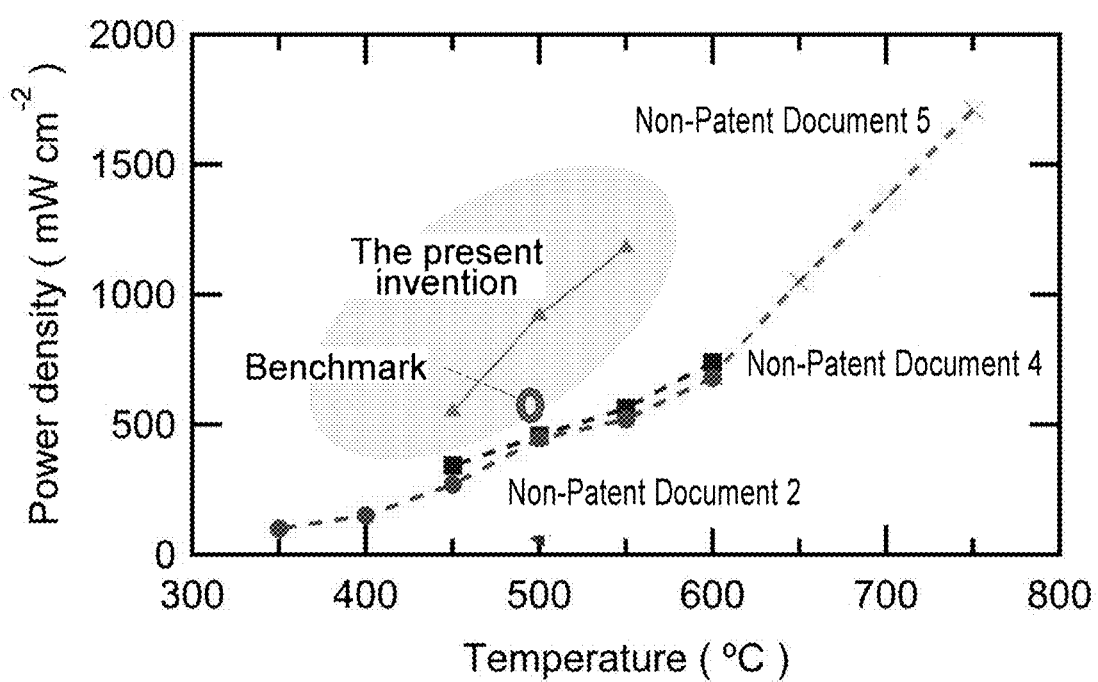
FIG. 1 shows the relationship between the peak outputs of the recent PCFCs and the operating temperatures. The data of Non-Patent Documents 2, 4, and 5, which show relatively high output, are indicated by ●, ■, and ×, respectively. Further, the output of the PCFC provided with the ECO thin film layer having a thickness of 30 nm achieved in Example of the present invention is shown by ▲. The temperature range of 350-570° C. and power density of 300-1500 mWcm$^{-2}$ shown in the figure are the targets for next-generation solid oxide fuel cells.

The PCFC of the present invention is a PCFC having a hydrogen permeable membrane as an anode, wherein an electrolyte material is $BaZr_xCe_{1-x-z}Y_zO_3$ (x=0.1 to 0.8, z=0.1 to 0.25, x+z≤1.0) (BZCY) and having an electron conductive oxide (ECO) thin film having a film thickness in the range of 1 to 100 nm between the electrolyte made of the above material and a cathode.

The PCFC is a fuel cell in which the electrolyte is made of proton conductive ceramics (solid). In the PCFC of the present invention, the electrolyte is BZCY which is a proton conductor. The BZCY is known as an electrolyte for the PCFC (see Non-Patent Document 1, for example) and is not particularly limited as long as it satisfies the above composition formula. However, considering the proton conductivity, x is preferably in the range of 0.1 to 0.8, z is preferably in the range of 0.15 to 0.25, and x+z is preferably in the range of <0.8.

The fuel cell of the present invention has at least an anode and a cathode in addition to the electrolyte, and the anode is a hydrogen permeable membrane. The hydrogen-permeable membrane means a membrane made of a material having proton ($H^+$ ion) conductivity but substantially no oxygen ion ($O^{2-}$ ion) conductivity. In the fuel cell of the present invention, since the anode is a hydrogen permeable membrane, the desired effect is exhibited by providing the ECO thin film between the electrolyte and the cathode. The film thickness of the anode, which is a hydrogen permeable film, is not particularly limited, but may be, for example, in the range of 1 to 1000 μm. However, it is not intended to be limited to this range. Examples of the hydrogen permeable film include a Pd (palladium) film and a Pd alloy film. Specific examples of the palladium alloy include Pd—Au (palladium-gold), Pd—Ag (palladium-silver), Pd—Pt (palladium-platinum), Pd—Cu (palladium-copper), and the like. In addition, a trace amount of a Group 3 element, a Group 4 element, a Group 5 element, an iron group element, or a platinum group element may be added to the above-mentioned palladium or palladium alloy. Specific examples of the additive element may include Y (yttrium), Ho (holmium), Ti (titanium), Zr (zirconium), Ni (nickel), Nb (niobium), V (vanadium), Ru (ruthenium) and the like. However, the hydrogen permeable membrane is not intended to be limited to this.

The cathode in the fuel cell of the present invention has a function of adsorbing oxygen molecules, dissociating them to ionize them. At the cathode, a reaction between a proton conducted through the electrolyte and an oxygen ion ($O^{2-}$ ion) (reduction reaction of oxygen) occurs. The material of the cathode is not particularly limited, but a known material used as the cathode of the fuel cell may be used. Examples of the material for the cathode include metal oxides having a perovskite type crystal structure, and specifically, samarium strontium cobaltite, for example, $Sm_{0.5}Sr_{0.5}CoO_3$, lanthanum strontium cobalt ferrite, for example, $La_{1-x}Sr_xFe_{1-y}Co_yO_3$ (0<x<1, 0.1≤y≤1), barium strontium cobalt ferrite, for example, $Ba_{0.5}Sr_{0.5}Co_{0.6}Fe_{0.4}O_3$, praseodymium nickel oxide, for example, $Pr_2NiO_4$ and the like. However, it is not intended to be limited to these. The film thickness of the cathode is not particularly limited, but may be, for example, in the range of 1 to 1000 μm. However, it is not intended to be limited to this range.

The fuel cell of the present invention has an ECO thin film having a film thickness in the range of 1 to 100 nm between the electrolyte made of BZCY and the cathode. The present inventors have found that in a PCFC in which the electrolyte is BZCY and the hydrogen permeable membrane is an anode, the PCFC output can be significantly enhanced by providing the ECO thin film between the electrolyte and the cathode.

The ECO for the thin film may be, for example, a lanthanum-containing perovskite compound, nickel oxide, manganese oxide, zinc oxide or indium oxide.

The lanthanum-containing perovskite compound may be those containing strontium and/or cobalt, and specific examples thereof include $La_{0.5}Sr_{0.5}CoO_3$ (LSC).

The nickel oxide is, for example, NiO, the manganese oxide is, for example, $MnO_2$, the iron oxide is, for example, $Fe_2O_3$, the zinc oxide is, for example, ZnO, and the indium oxide is, for example, $In_2O_3$.

The ECO may be an aggregate of polycrystalline or amorphous particles or a mixture thereof, and having such a structure is preferable because it exhibits excellent proton transfer characteristics. In other words, the transfer resistance of protons between the electrolyte and the cathode is greatly reduced. The ECO may be a polycrystal with polycrystallinity. A polycrystal is an aggregate of many crystallites. The size and shape of the crystallite are not particularly limited, but the size may be such that the diameter of the crystallite is, for example, 3 to 20 nm, and the shape is preferably spherical or rectangular parallelepiped fine particles. In the case of an agglomerate of amorphous particles, the particle size of the amorphous particles may be, for example, in the range of 3 to 20 nm and the shape may be spherical or nearly spherical. The ECO may also be a mixture of crystallites and amorphous particles.

It has been experimentally confirmed that the thickness of the ECO thin film is important for enhancing the output of the PCFC, and the film thickness is in the range of 1 to 100 nm. The thickness of the ECO thin film is preferably uniform over the entire area of the ECO thin film, but there may be some variation depending on the location, and even if there is variation, the film thickness is preferably in the range of 1 to 100 nm. The thickness of the ECO thin film may be determined, for example, by observing the cross section of the thin film. The thickness of the ECO thin film is preferably in the range of 5 to 80 nm from the viewpoint of obtaining higher output. However, an appropriate film thickness may be appropriately set depending on the type of ECO, the composition of BZCY and the type of cathode.

The PCFC of the present invention may have an operating temperature in the range of, for example, 400 to 600° C. A preferable operating temperature is 450° C. or higher, a more preferable operating temperature is 500° C. or higher, further preferably 550° C. or higher.

[PCFC Production Method]

The method for producing a PCFC of the present invention is a method of producing a PCFC having a hydrogen permeable membrane as an anode, which comprises forming a thin film having a film thickness in the range of 1 to 100 nm between an electrolyte made of BZCY and a cathode, and the thin film is an electronically conductive oxide (ECO).

The PCFC having the hydrogen permeable membrane whose electrolyte material is BZCY as an anode and the ECO thin film layer are as described above. Furthermore, the types of the ECO are as described above as well.

The ECO thin film may be formed, for example, on the BZCY electrolyte by a sputtering method or a sol-gel method. The electrolyte may be preformed on the anode. The sputtering for forming the thin film may be performed by, for example, a high frequency magnetron sputtering method. The target for sputtering may be an ECO or a metal or alloy forming an ECO, and when a metal or alloy is used, sputtering is performed in an oxygen-containing atmosphere to form an oxide. Sputtering mainly forms a polycrystalline ECO thin film. When the ECO is LSC or NiO, a thin film may also be formed by the sol-gel method (Non-Patent Document 6).

A PCFC may be formed by further forming a cathode on the ECO thin film formed on the BZCY electrolyte. The ECO thin film may be formed on the cathode in the same manner as above, and the BZCY electrolyte and the anode may be formed thereon. However, when the BZCY electrolyte is formed on the ECO thin film, if the thin film has a structure of an aggregate of polycrystalline or amorphous particles or a mixture thereof, it is preferable to maintain the state. It is easier to maintain the structure of the thin film in case where the ECO thin film on the BZCY electrolyte is formed and then the cathode is formed thereon.

EXAMPLES

The present invention is further specifically described based on Examples. Examples exemplify the present invention and it is not intended that the present invention is limited by Examples.

<Experimental Methods>

A $BaZr_{0.1}Ce_{0.7}Y_{0.2}O_3$(BZCY) electrolyte thin film (1 μm) was deposited on a Pd foil anode substrate by high frequency sputtering. The sputter deposition conditions are summarized in Table 1. Here, film formation was performed by co-sputtering using $BaCe_{0.8}Y_{0.2}O_3$ and $Zr_{0.9}Y_{0.1}O_2$ targets.

TABLE 1

| RF sputtering conditions for BZCY electrolyte thin film | |
|---|---|
| Sputtering atmosphere | 0.2%-$O_2$/Ar ($O_2$: 0.1 sccm, Ar: 49.9 sccm) |
| Substrate temperature | 500° C. |
| Target and substrate distance | $BaCe_{0.8}Y_{0.2}O_3$: 70 mm<br>$Zr_{0.9}Y_{0.1}O_2$: 120 mm |
| Sputtering output | $BaCe_{0.8}Y_{0.2}O_3$: 70 W<br>$Zr_{0.9}Y_{0.1}O_2$: 30 W |
| Sputtering pressure | 2.0 Pa |
| Sputter time | 7 h |
| Annealing temperature | 700° C. |
| Annealing atmosphere | $O_2$ ($p_{O2}$ = 1.6 Pa) |
| Annealing time | 1 h |

On top of the electrolyte thin film, a $La_{0.5}Sr_{0.5}CoO_3$ (LSC) thin film (10-100 nm) or a NiO thin film (30 nm), which is an ECO, was vapor-deposited by a high frequency sputtering method between the BZCY and a cathode. Table 2 shows the respective sputtering conditions.

TABLE 2

| LSC thin film sputtering conditions | | |
|---|---|---|
| | $La_{0.5}Sr_{0.5}CoO_3$ | NiO |
| Sputtering atmosphere | 1%-$O_2$/Ar<br>($O_2$: 0.5 sccm,<br>Ar: 49.5 sccm) | 1%-$O_2$/Ar<br>($O_2$: 0.5 sccm,<br>Ar: 49.5 sccm) |
| Substrate temperature | 500° C. | 500° C. |
| Target and substrate distance | $La_{0.5}Sr_{0.5}CoO_3$: 120 mm | 120 mm |
| Sputtering output | $La_{0.5}Sr_{0.5}CoO_3$: 50 W | $La_{0.5}Sr_{0.5}CoO_3$: 50 W |
| Sputtering pressure | 2.0 Pa | 2.0 Pa |
| Sputter time | 10-60 min | 20 min |
| Annealing temperature | 700° C. | 700° C. |
| Annealing atmosphere | $O_2$ ($p_{O2}$ = 1.6 Pa) | $O_2$ ($p_{O2}$ = 1.6 Pa) |
| Annealing time | 5 min | 5 min |

After the vapor deposition, $La_{0.6}Sr_{0.4}Co_{0.2}Fe_{0.8}O_3$(LSCF) powder paste (a product of Fuel Cell Materials Inc.), which is a general fuel cell cathode material, is screen-printed on the front surface of the electrolyte thin film or LSC thin film layer to form a porous cathode resulting in formation of a fuel cell. The prepared cell was attached to a self-made fuel cell station, and humidified air ($H_2O/O_2/Ar=3/20/77$) was supplied to the cathode side and pure hydrogen was supplied to the anode side at 50 sccm to perform a power generation test. Current-voltage and current-output curves of the cell were measured using a Solartron 1268/1270 electrochemical analyzer. The polarization characteristics of the cell during power generation were also evaluated with the same device.

The anode-supported fuel cell was produced by a general reaction sintering method. BZCY electrolyte raw material powders, $BaCO_3$ (High Purity Chemical; purity: 99.95%), $CeO_2$ (High Purity Chemical; purity: 99.99%), $ZrO_2$ (High Purity Chemical; purity: 98%), $Y_2O_3$ (High Purity Chemical; purity: 99.99%) were mixed in a stoichiometric ratio, and 3.56 wt. % of $Zn(NO_3)_2 \cdot 6H_2O$ (Wako Pure Chemical; purity: 99.9%) was added as a sintering aid. Then, NiO powder was added so that the mass ratio of BZCY and NiO after sintering was 40:60. The mixture was ball-milled for 24 hours using ethanol as a solvent and then dried. The resulting slurry was crushed and a molding aid was added. The powder thus obtained was uniaxially molded at 20 MPa and then CIP (Cold Isostatic Pressing) at 100 MPa to form pellets.

A suspension of BZCY raw material powder ($BaCO_3+CeO_2+ZrO_2+Y_2O_3$) was spin-coated (3000 rpm, 40 seconds) on both sides of the produced pellet, and finally sintered at 1400° C. for 8 hours. As a result, a membrane/electrode assembly in which a BZCY electrolyte thin film having a thickness of about 30 μm is formed on the BZCY-Ni porous cermet support is obtained. Finally, an LSCF ink was screen-printed on the BZCY electrolyte thin film as a cathode. Also, if necessary, the LSC thin film layer was sputter-deposited by the above method before the screen printing. With this method, an anode-supported cell was produced.

<Experimental Results>

Figure 2:
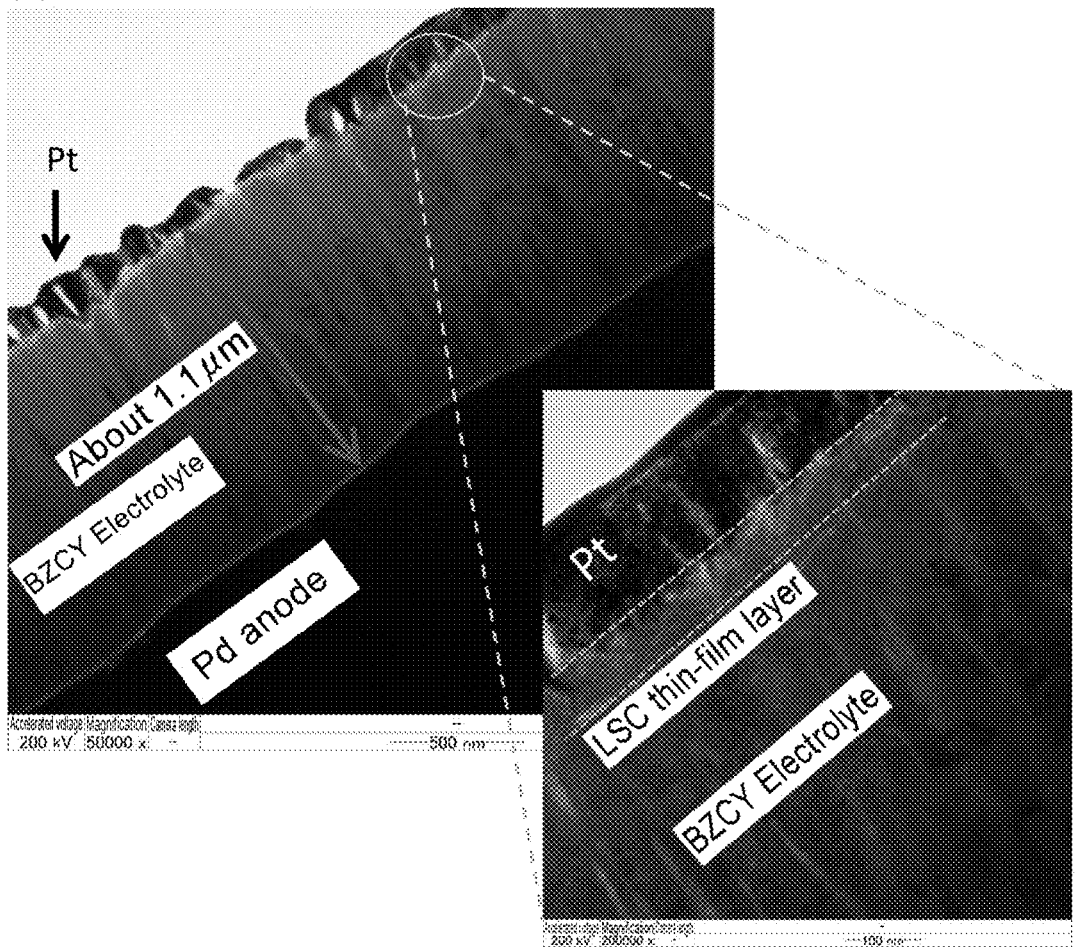
FIG. 2(a) shows a cross-sectional TEM image of a BZCY/LSC thin film formed on a Pd substrate. (b) shows the XRD pattern of the ECO LSC thin film prepared on a Si substrate.
Figure 2:
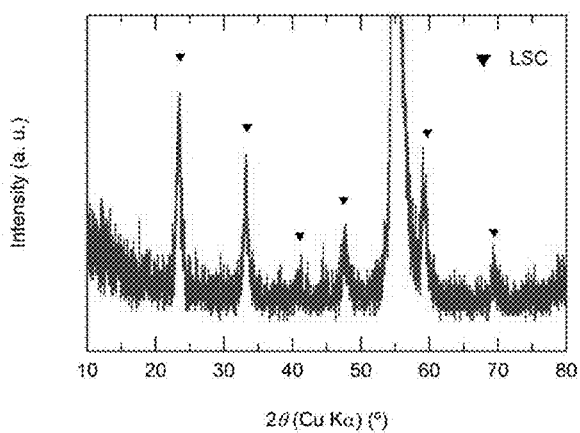

FIG. 2(a) shows a cross-sectional TEM photograph of a BZCY thin film with a 30 nm LSC thin film layer. The thin film has a fine structure in which columnar particles with a diameter of about 100-200 nm grow in the direction perpendicular to the substrate and are densely aggregated with each other. Such characteristics are often seen in metal oxide thin films prepared by the vacuum deposition method. From the EPMA measurement, the metal composition ratio was Ba/Zr/Ce/Y=1.0/0.69/0.18. Further, FIG. 2(b) shows an XRD pattern of an LSC thin film (200 nm) deposited on a Si wafer by the same sputtering method. It shows a very broad peak, and the crystallite diameter obtained from the half-width of the (020) peak appearing near 22° is about 5 nm, which is in good agreement with the TEM observation results.

Figure 3:
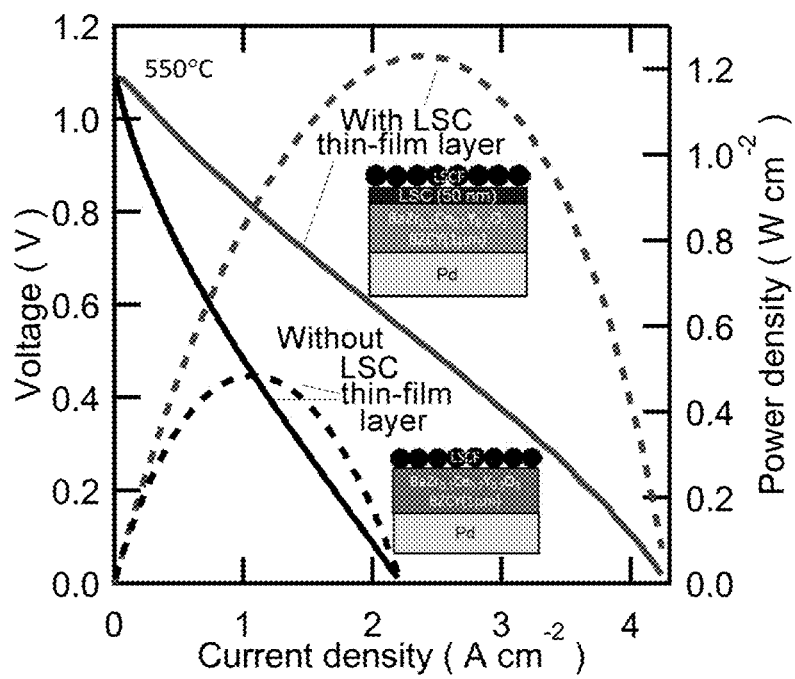
FIG. 3 shows power generation characteristics at 550° C. and 500° C. of a fuel cell having LSC thin film layer (30 nm) as an ECO and a fuel cell not having this thin film layer.
Figure 3:
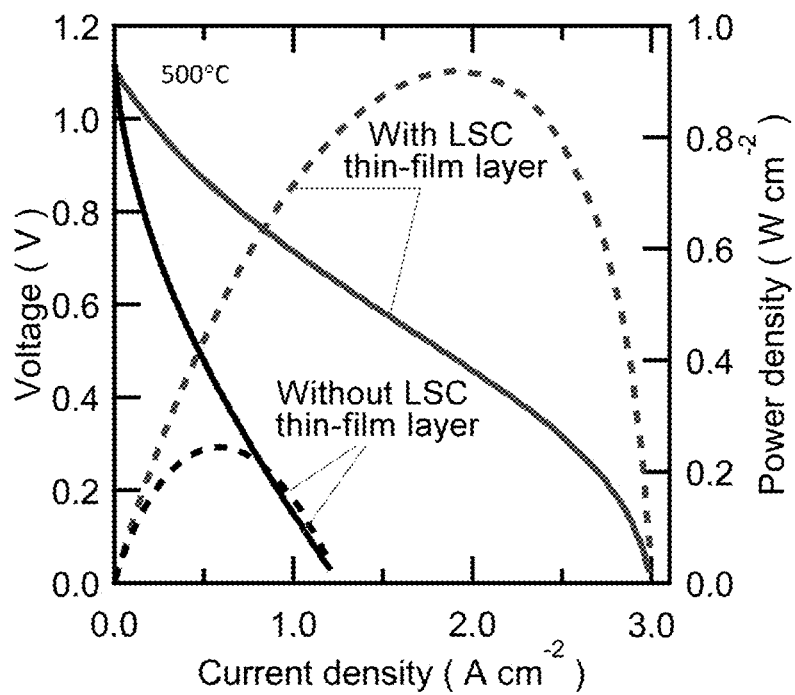

FIG. 3 shows the fuel cell characteristics with or without the LSC thin film layer (30 nm). A fuel cell without LSC thin film layer: $H_2$, Pd|BZCY|LSCF, air exhibited open circuit voltage 1.07 V and peak output 0.48 W cm$^{-2}$ at 550° C., and open circuit voltage 1.1 V at 500° C. but the peak output decreased to about 0.2 W cm$^{-2}$. However, with a fuel cell with a 10 nm LSC thin film layer deposited on the surface of BZCY: $H_2$, Pd|BZCY/LSC|air, open circuit voltage of 1.08 V and a peak output of 1.2 W cm$^{-2}$ were achieved at 550° C. and open circuit voltage of 1.1 V and a peak output of 0.92 W cm$^{-2}$ were achieved even at 500° C. This is a higher value than the champion data (0.47 W cm$^{-2}$) in the conventional paper [Non-Patent Document 2].

Figure 4:
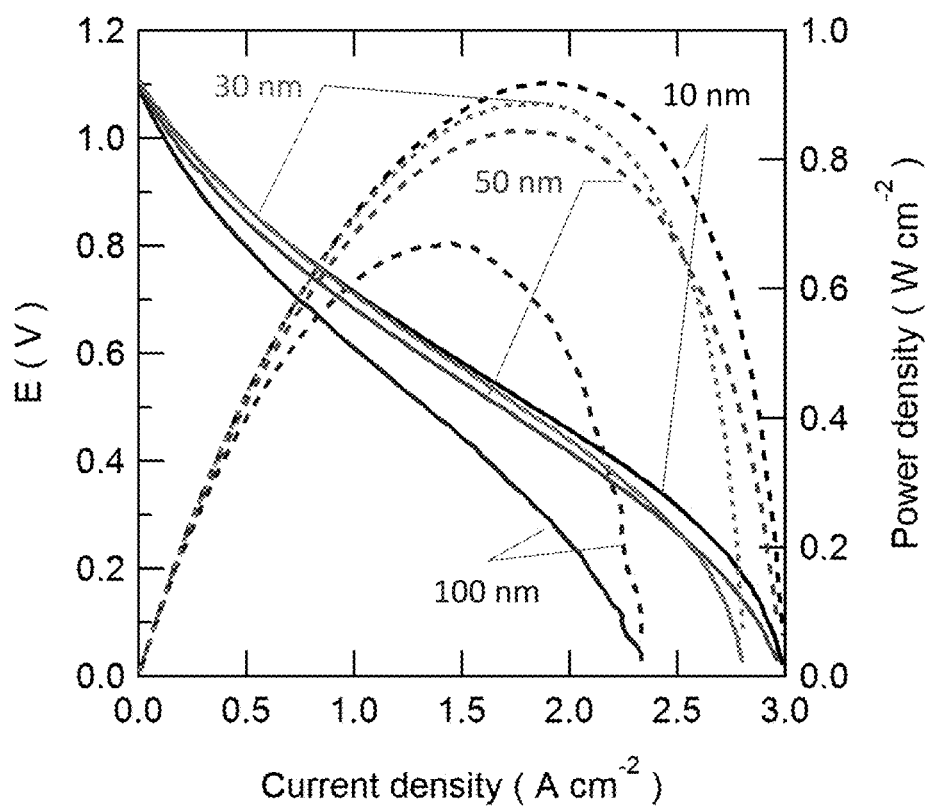
FIG. 4 shows output characteristics at 500° C. of a fuel cell: $H_2$, Pd|BZCY/LSC|LSCF, air provided with an LSC thin film layer having various thicknesses in the range of 10 to 100 nm.

FIG. 4 shows the output characteristics of a fuel cell with an LSC thin film of varying thickness: $H_2$, Pd|BZCY/LSC|LSCF air at 500° C.

Figure 5:
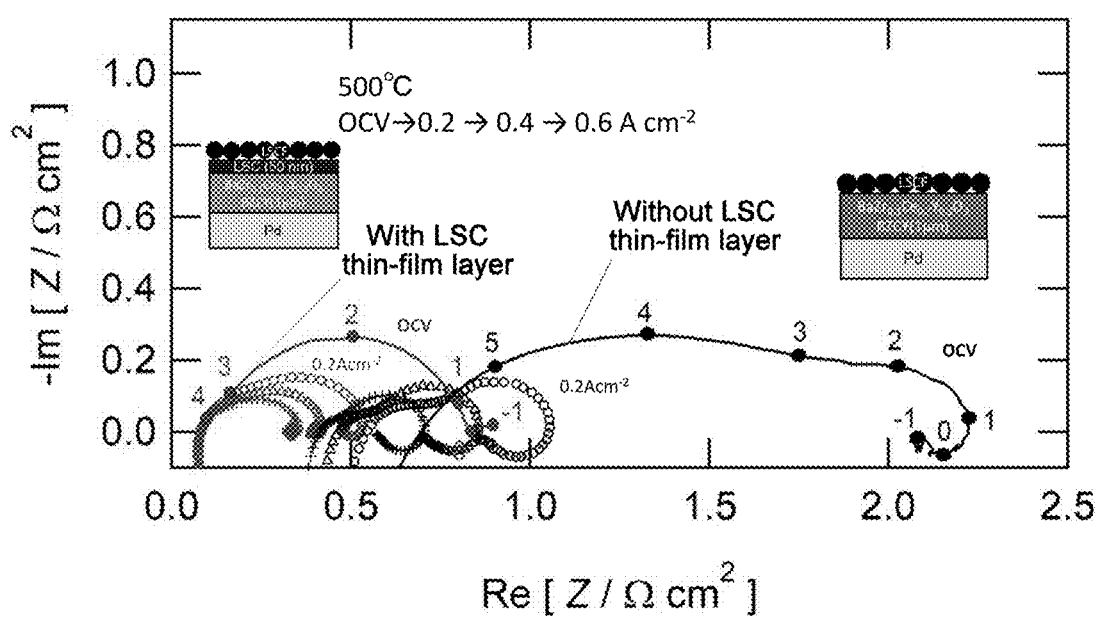
FIG. 5 shows impedance spectra of a fuel cell with and without an ECO LSC thin film layer (30 nm) during power generation under each current condition at 500° C. The solid line shows the spectrum under the OCV (0 mA cm$^{-2}$) condition, and the number near the point (dot) on the spectrum represents the exponent of the measured frequency at that point.

FIG. 5 shows the impedance spectra of fuel cells with or without an LSC thin film layer (30 nm) measured at 500° C. under various DC conditions. Generally, in the impedance spectrum of a fuel cell, the x-intercept on the high frequency side corresponds to the proton transfer resistance in the electrolyte, and the subsequent semicircle corresponds to the sum of various reaction resistances at the electrode/electrolyte interface, that is, a polarization resistance. [Non-Patent Document 7]. It is known that, particularly in a proton-conducting ceramics fuel cell, the resistance associated with the cathode reaction occupies most of the polarization resistance [Non-Patent Document 4].

Figure 6:
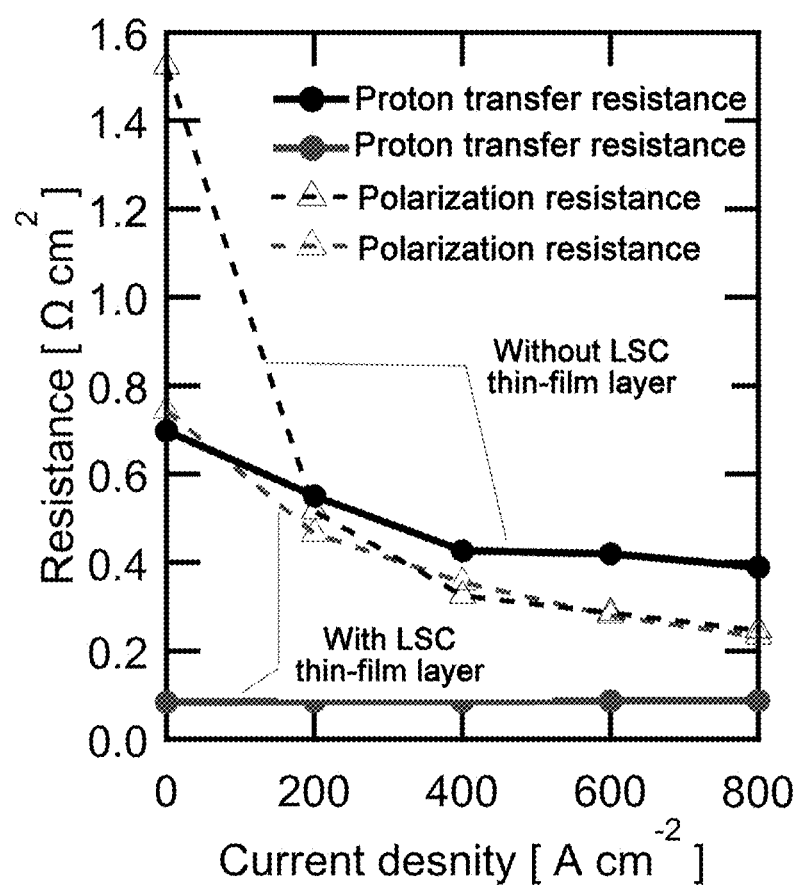
FIG. 6 is a figure of plot of the proton transfer resistance determined from the x-intercept and the polarization resistance determined from the diameter of the arc, from the impedance spectra when power is generated under various DC conditions.

FIG. 6 shows the changes in the proton transfer resistance (solid line) and the polarization resistance (broken line) under each current condition. It can be seen that the deposition of the LSC thin film layer does not change the polarization resistance but clearly reduces the proton transfer resistance of the electrolyte. Furthermore, in the case where the LSC thin film layer is not provided, the proton transfer resistance is significantly decreased with the increase of the current, which means that most of the transfer resistance of the proton is related to the movement of the electrolyte/cathode interface. It is shown that when the cathode reaction is activated, since this interfacial proton transfer is increased, the resistance is decreased. On the other hand, when the LSC thin film layer is provided, the interfacial migration resistance is dramatically reduced, and as a result, it is found that the resistance value is always very small regardless of activation of the cathode reaction.

Figure 7:
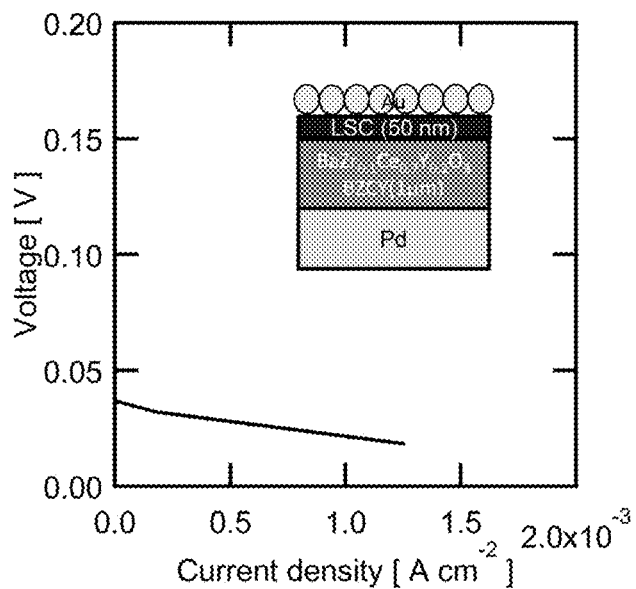
FIG. 7 shows output characteristics of a fuel cell using an Au cathode at 500° C.: $H_2$, Pd|BZCY/LSC|Au, air, and impedance at OCV. The impedance spectrum of the cell using the LSCF cathode is also shown for reference.
Figure 7:
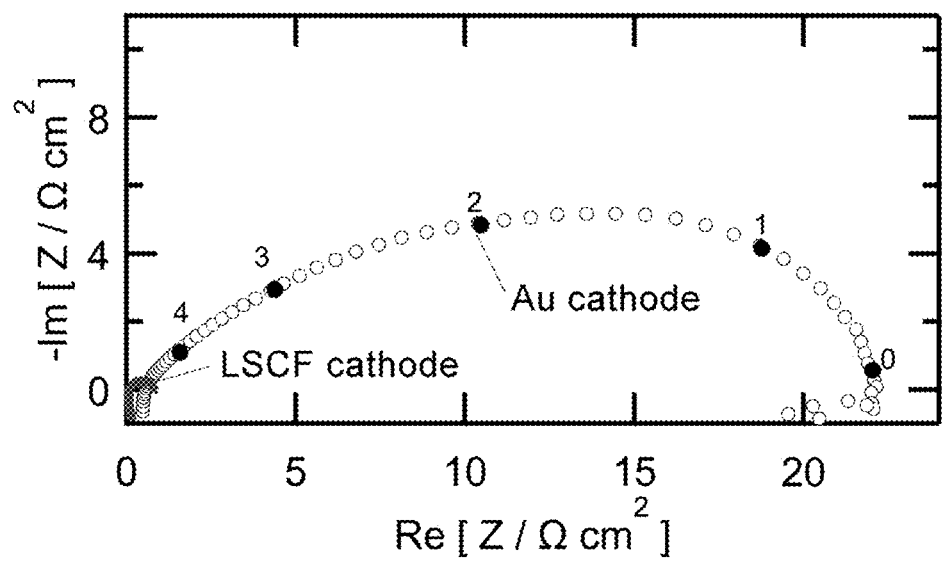

FIG. 7 shows the output characteristics of the fuel cell; $H_2$, Pd|BZCY/LSC|Au, air that uses porous Au instead of the porous LSCF (upper figure) and the impedance spectrum during OCV (lower figure). The OCV was less than 0.1 V and the output was almost 0, and the corresponding impedance spectrum showed extremely large reaction resistance. This result also confirms that the LSC thin film layer does not directly contribute to the cathode reaction, considering that the Au electrode does not function as the cathode of the fuel cell.

Figure 8:
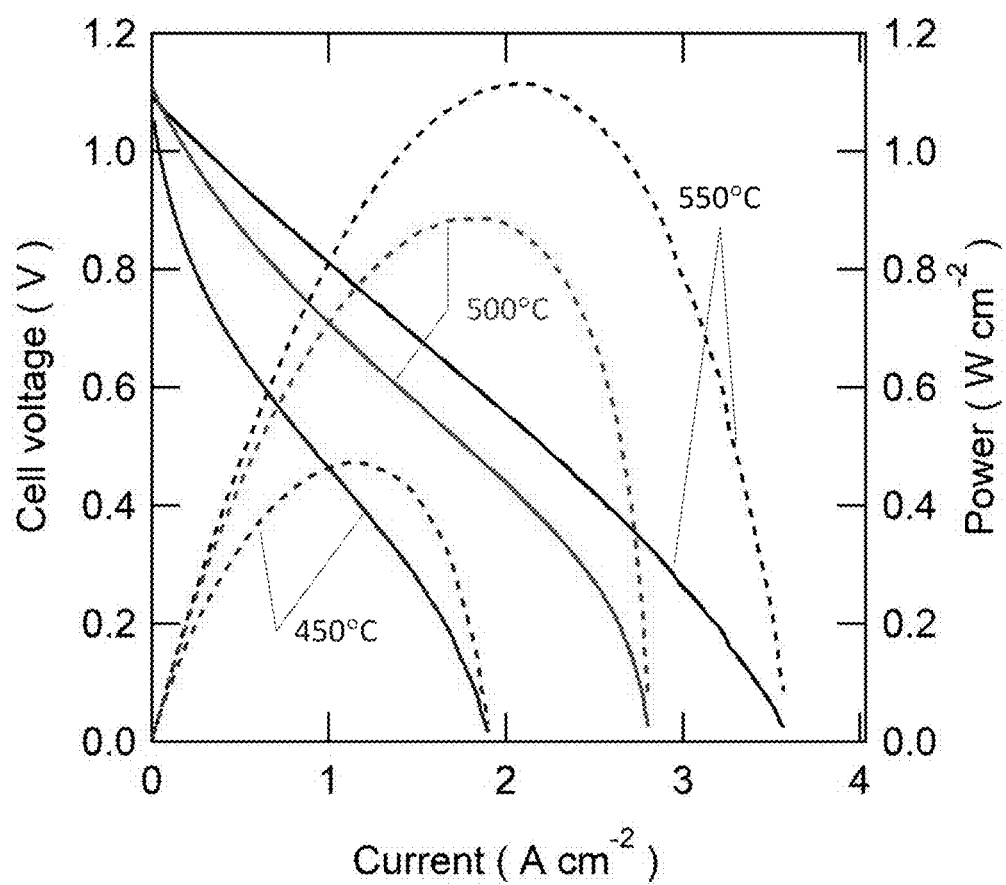
FIG. 8 shows the output characteristics of a fuel cell provided with an ECO NiO thin film layer of 30 nm: $H_2$, Pd|BZCY/NiO|LSCF, air at 450, 500 and 550° C.

FIG. 8 shows the output characteristics of the fuel cell in which a NiO thin film layer (30 nm) was deposited as an ECO thin film instead of the LSC thin film layer: $H_2$, Pd|BZCY/NiO|LSCF, air. At 450, 500 and 500° C., OCV is 1.05V, 1.12V and 1.10V, respectively, and peak power densities are 0.49, 0.90 and 1.14 W cm$^{-2}$, respectively, which is almost the same performance as when using the LSCF interface layer. Therefore, it was found that in addition to LSCF, if a thin film with a nano-level thickness of other oxide having electron conductivity such as NiO is provided between the cathode/electrolyte membrane, the proton transfer resistance at the electrolyte/cathode interface is dramatically reduced.

Figure 9:
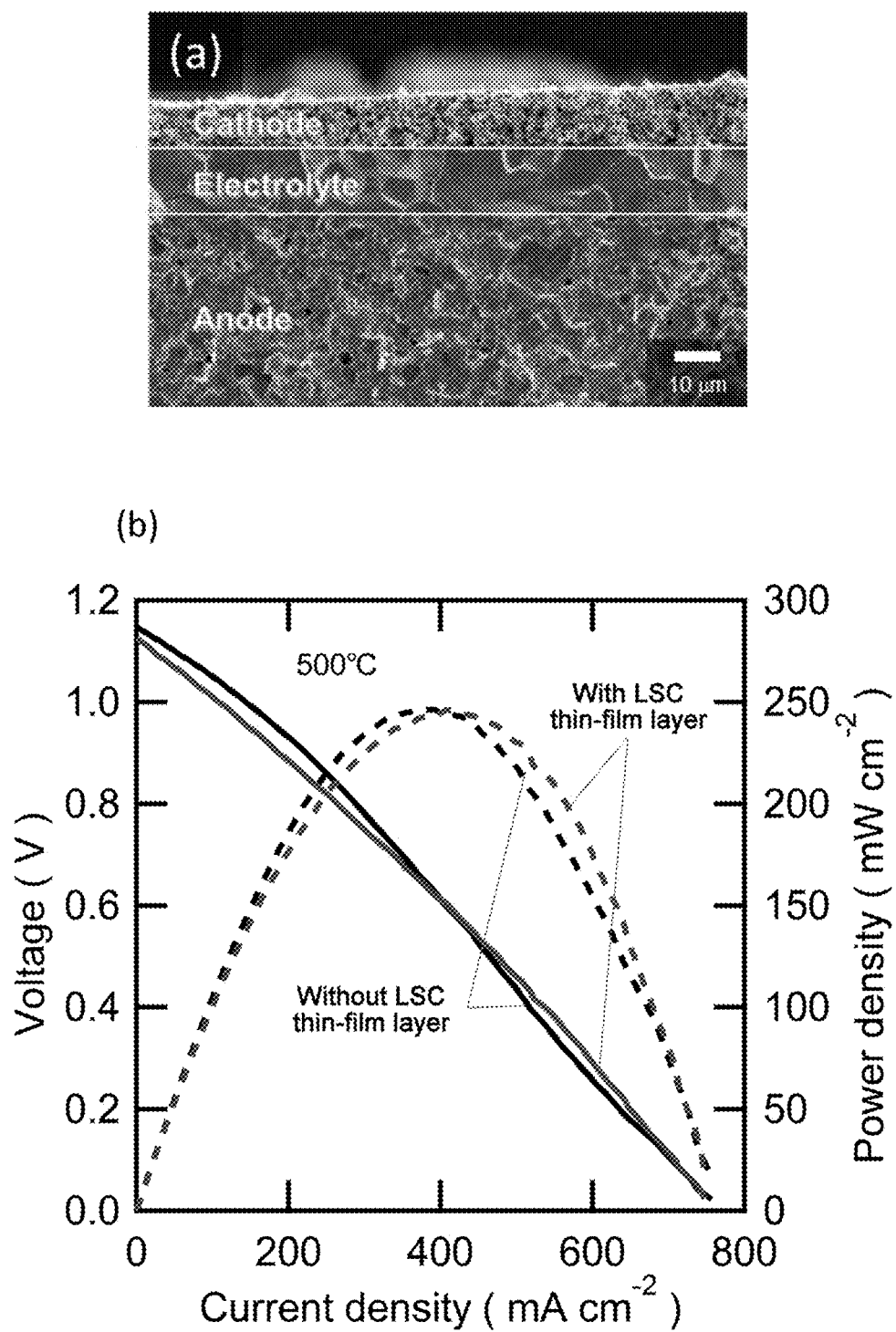
FIG. 9(a) shows a cross-sectional SEM photograph of an anode-supported cell: Ni-BZCY|BZCY|LSCF. (b) shows the power generation performance at 500° C. of an anode-supported fuel cell with and without ECO LSC thin film layer (30 nm).

FIG. 9 shows the output characteristics of the anode-supported fuel cell with Ni-BZCY as an anode with the LSC thin film layer and the anode-supported fuel cell without the LSC thin film layer in (b). In the case of the anode-supported fuel cell in which the anode was not a hydrogen permeable membrane, even if an ECO thin film such as the LSC thin film layer was provided, no significant improvement in output was seen. Therefore, it can be seen that the output structure by the ECO thin film layer in the present invention is an effect obtained in the PCFC using the hydrogen permeable film such as Pd as the anode.

Figure 10:
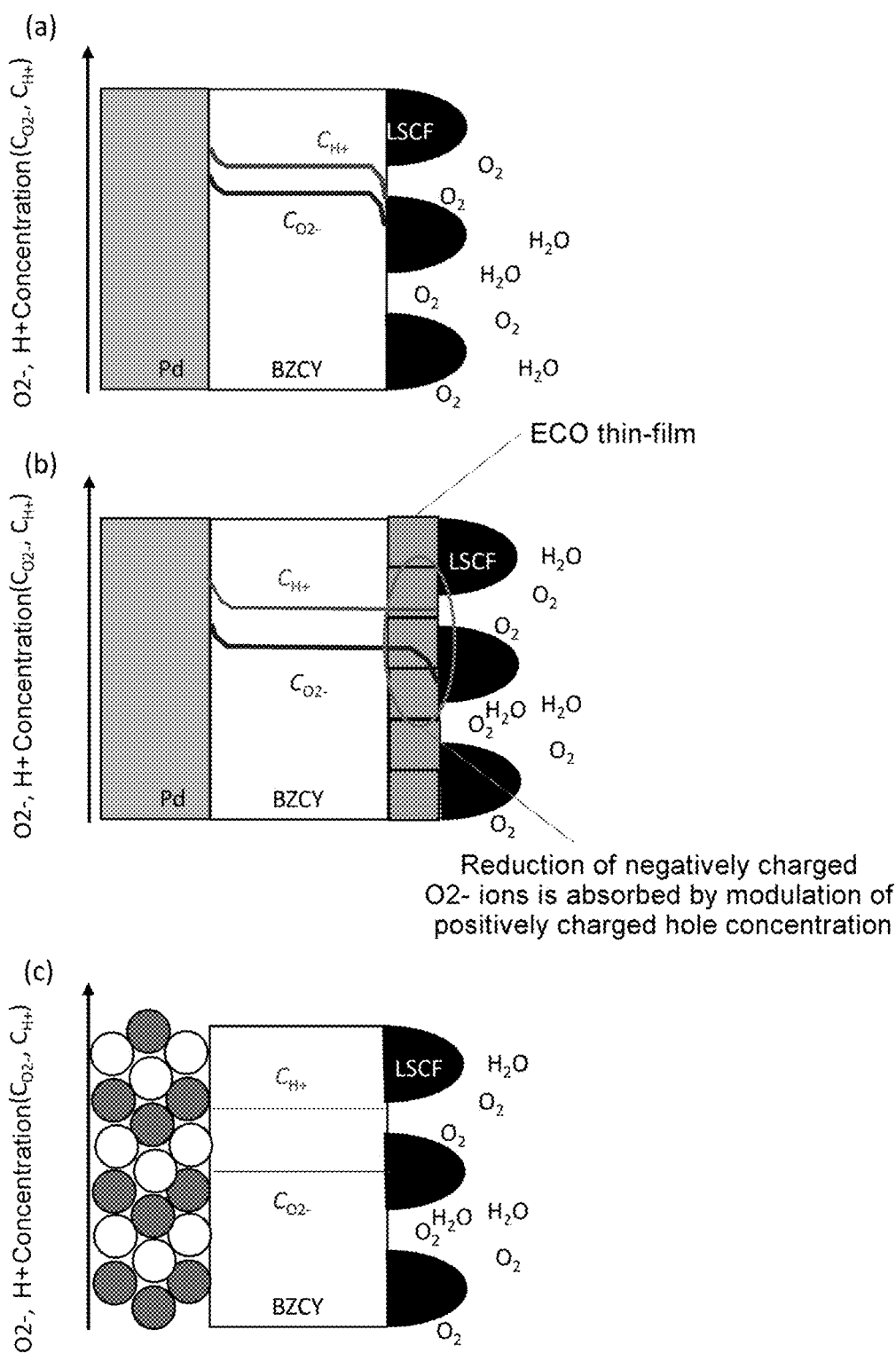
FIG. 10 shows oxide ion and proton concentration profiles in the electrolyte in each fuel cell.

It is known that the conductive species of the BZCY electrolyte have $O^{2-}$ (oxide ions) and $h^+$ (holes) as minor carriers in addition to $H^+$ ions as the main carrier [Non-Patent Document 8]. In the case of an anode-supported fuel cell using a cermet electrode, water production reaction at the anode also progresses due to $O^{2-}$ ion conduction from the cathode to the anode (FIG. 10(c)). However, since a non-porous hydrogen permeable membrane such as Pd does not conduct $O^{2-}$ ions, that is, acts as a blocking electrode, the flow rate of $O^{2-}$ ions in this BZCY electrolyte becomes 0 (FIG. 10(a)). Therefore, in the electrolyte membrane of the hydrogen-permeable Pd membrane fuel cell, as shown in FIG. 10(a), a very unique profile in which the $O^{2-}$ ion concentration decreases toward the vicinity of the cathode electrode interface so that the diffusion of $O^{2-}$ ions does not occur is formed. On the other hand, in the case of the anode-supported cell, the $O^{2-}$ ion concentration is almost constant from the cathode to the anode (FIG. 10(c)). The reduction of negatively charged $O^{2-}$ ions near the cathode also reduces the concentration of positively charged counter $H^+$ ions, which increases the proton transfer resistance near the interface.

Considering the above, although not intended to be bound by theory, the effect of promoting the interfacial proton transfer by the ECO thin film layer obtained in the present invention is considered as shown in FIG. 10(b). In order to suppress $O^{2-}$ ion conduction in the BZCY electrolyte, the $O^{2-}$ ion profile in the ECO thin film decreases from the cathode interface toward the BZCY interface (FIG. 10(b)). In this case, since the main carrier of ECO is an electron or a hole, the hole concentration with a positive charge is modulated. From the TEM image of FIG. 2, it can be seen that the LSC thin film layer is composed of fine particles having a diameter of about 5 nm. Therefore, it is considered that the protons existing only on the ECO particle surface move to the cathode through the particle interface. Therefore, it is speculated that the effect of providing the ECO thin film layer is due to the function of keeping the proton concentration of BZCY constant near the cathode. However, the present invention is not limited to this theory.

INDUSTRIAL APPLICABILITY

The present invention is useful in the field related to a PCFC.

The invention claimed is:

1. A proton ceramics fuel cell in which an electrolyte material is $BaZr_xCe_{1-x-z}Y_zO_3$ (x=0.1 to 0.8, z=0.1 to 0.25, x+z≤1.0) and a hydrogen permeable membrane is an anode, wherein the fuel cell comprises an electron conductive oxide thin film having a film thickness in a range of 1 to 100 nm between the electrolyte made of the above material and a cathode.

2. The fuel cell according to claim 1, wherein the electron conductive oxide is lanthanum-containing perovskite compound, nickel oxide, manganese oxide, zinc oxide or indium oxide.

3. The fuel cell according to claim 2, wherein the lanthanum-containing perovskite compound contains strontium and/or cobalt.

4. The fuel cell according to claim 2, wherein the lanthanum-containing perovskite compound is $La_{0.5}Sr_{0.5}CoO_3$.

5. The fuel cell according to claim 1, wherein the film thickness of the thin film is in a range of 5 to 80 nm.

6. The fuel cell according to claim 1, wherein the electron conductive oxide thin film is an electron conductive oxide agglomerate thin film.

7. The fuel cell according to claim 6, wherein the electron conductive oxide agglomerate thin film is a polycrystalline thin film, a thin film of an aggregate of amorphous particles or a thin film of a mixture of a polycrystalline and an aggregate of amorphous particles.

8. The fuel cell according to claim 1, wherein operating temperature is in a range of 400 to 600° C.

9. The fuel cell according to claim 1, wherein the cathode is a porous cathode.

10. The fuel cell according to claim 1, wherein the cathode is a porous cathode and the electron conductive oxide thin film is an electron conductive oxide agglomerate thin film.

11. The fuel cell according to claim 1, wherein the electron conductive oxide is nickel oxide, manganese oxide, zinc oxide or indium oxide.

12. A method for production of a proton ceramics fuel cell comprising a hydrogen permeable membrane as an anode, wherein the method comprises formation of a thin film having a film thickness in a range of 1 to 100 nm between an electrolyte made of $BaZr_xCe_{1-x-z}Y_zO_3$ (x=0.1 to 0.8, z=0.1 to 0.25, x+z≤1.0) and a cathode, and the thin film is comprised of an electron conductive oxide.

13. The method for production according to claim 12, wherein the electron conductive oxide is lanthanum-containing perovskite compound, nickel oxide, manganese oxide, zinc oxide or indium oxide.

14. The method for production according to claim 12, wherein the electron conductive oxide thin film is an electron conductive oxide agglomerate thin fim.

15. The method for production according to claim 14, wherein the electron conductive oxide agglomerate thin film is a polycrystalline thin film, a thin film of an aggregate of amorphous particles or a thin film of a mixture of a polycrystalline and an aggregate of amorphous particles.

16. The method for production according to claim 12, wherein the electron conductive oxide thin film is formed by a sputtering method or a sol-gel method.

17. The method for production according to claim 12, wherein the cathode is a porous cathode.

18. The method for production according to claim 12, wherein the cathode is a porous cathode and the electron conductive oxide thin film is an electron conductive oxide agglomerate thin film.

19. The method for production according to claim 12, wherein the electron conductive oxide is nickel oxide, manganese oxide, zinc oxide or indium oxide.

* * * * *